United States Patent
Ralston et al.

[11] 3,976,144
[45] Aug. 24, 1976

[54] SPRING AUTOMATIC RESET PLOW ASSEMBLY WITH RESET DAMPER SYSTEM

[75] Inventors: Harold A. Ralston, Bettendorf, Iowa; Phillip G. Venable, Orion, Ill.

[73] Assignee: J. I. Case Company, Racine, Wis.

[22] Filed: June 30, 1975

[21] Appl. No.: 591,668

Related U.S. Application Data

[62] Division of Ser. No. 450,720, March 13, 1974, Pat. No. 3,949,814.

[52] U.S. Cl. .............................. 172/267; 172/705; 267/137; 403/79; 403/157
[51] Int. Cl.² ................ A01B 61/04; A01B 15/14; A01B 35/24
[58] Field of Search .......... 172/264, 265, 266, 267, 172/268, 705, 706, 708, 710; 403/79, 120, 157, 158, 159, 166, 327; 267/72, 137, 138

[56] References Cited
UNITED STATES PATENTS

| | | | |
|---|---|---|---|
| 468,764 | 2/1892 | Flatau | 172/265 |
| 636,342 | 11/1899 | Lambert | 172/266 X |
| 894,247 | 7/1908 | Walter | 172/267 |
| 903,117 | 11/1908 | Waterman | 172/268 |
| 917,603 | 4/1909 | Hench | 172/267 |
| 1,951,701 | 3/1934 | Major | 172/710 X |
| 2,109,385 | 2/1938 | Garrison | 172/267 |
| 2,142,455 | 1/1939 | Needham | 172/268 |
| 2,312,405 | 3/1943 | Haagen | 172/264 |
| 2,565,668 | 8/1951 | Simpson | 172/267 |
| 3,120,873 | 2/1964 | Bledsoe | 172/708 X |
| 3,321,027 | 5/1967 | Johnson et al. | 172/266 |
| 3,486,566 | 12/1969 | Nja | 172/705 X |
| 3,550,690 | 12/1970 | Quanbeck | 172/265 |
| 3,561,541 | 2/1971 | Woelfel | 172/265 |

FOREIGN PATENTS OR APPLICATIONS

| | | | |
|---|---|---|---|
| 8,716 | 8/1927 | Australia | 172/705 |
| 225,840 | 6/1958 | Australia | 172/266 |
| 1,033,747 | 4/1953 | France | 172/7.5 |
| 1,246,335 | 10/1960 | France | 172/264 |

*Primary Examiner*—Richard T. Stouffer
*Attorney, Agent, or Firm*—Cullen, Settle, Sloman & Cantor

[57] ABSTRACT

An automatic reset plow assembly includes a plow frame drawn by an agricultural vehicle. A plow standard is pivotally connected to the underside of the frame to enable the plow share to pivot backwardly and upwardly upon engaging an obstruction in the soil. The plow standard is resiliently biased downwardly by a toggle link assembly having one link pivotally connected to the plow standard and a second link pivoted to the frame. The other ends of the two links are pivotally connected together and to a slide element to form the elbow of the toggle link. The slide element is slideably received along a guide member which is also pivotally mounted to the frame. A compression spring surrounds the guide and resiliently biases the slide element and toggle links to maintain the plow standard in a normally downwardly pivoted plowing position. Upon encountering an obstruction, the plow pivots rearwardly and collapses the toggle link assembly. After the plow passes the obstruction, the spring returns the toggle link assembly and plow to their normal operative position. A damper assembly is optionally provided at the connection between the frame and second link to reduce shock resulting from the return of the plow from its tripped positioned to its operative plowing position.

1 Claim, 6 Drawing Figures

SPRING AUTOMATIC RESET PLOW ASSEMBLY WITH RESET DAMPER SYSTEM

This application is a divisional application of Ser. No. 450,720, filed Mar. 13, 1974, now U.S. Pat. No. 3,949,814.

BACKGROUND OF THE INVENTION

1. Field of the Invention

This invention relates generally to agricultural implements, such as plows, which trip upon encountering an immovable obstruction and then automatically reset in their operative position after having passed the obstruction.

2. Prior Art Devices

Most cultivatable land has at least some hidden obstructions in the soil in the form of large and usually immovable objects such as rocks, roots, stumps, or the like. These objects can cause severe damage to earth working implements which are used in either preparing the soil for seeding or subsequently for cultivating. It is obviously both impractical and impossible to remove all these obstacles; therefore, some provision must be made to avoid damage to the earth working elements of the implement when such elements strike the hidden obstructions.

Various attempts have been made in the prior art to design an earth working implement which can pivot upwardly and backwardly when striking an obstruction, in order to avoid damage to the implement.

For example, many of the previous implements have included a latch mechanism which releases the ground working tool and permits it to pivot upwardly when it strikes an obstruction. The drawback to such prior art devices lies in the fact that once the latch mechanism has been disengaged, the operator must reset the ground working tool either manually or by backing up the entire implement. Such a device is shown, for example, in U.S. Pat. No. 2,690,111 to Altgelt. Because of the inherent drawbacks in the latch-type release mechanism, other prior art attempts at designing a releasable earthworking implement have focused on a spring biased arrangement to maintain the earthworking implement in the ground under ordinary working conditions. However, a common drawback to these type devices is the inability of the spring arrangement to reset the earthworking implement back into the soil after it passes the obstruction. This problem is fully understandable when the various forces working against the downward pivotal resetting movement of the plow are appreciated. First, the downward biasing force must be great enough to cause the plow to penetrate the soil and assume its prior plowing position. Second, a rearward reaction force, which is due to the plow moving forward behind an agricultural vehicle, must be overcome. If these two forces are not overcome, the earthworking implement will not reset properly.

U.S. Pat. Nos. 407,780 to Kissell, 903,117 to Waterman, 2,679,972 to Sheppard, and 3,321,027 to Johnson et al represent prior art devices having a spring biased toggle link assembly to maintain the plow or other earthworking implements in the ground under normal operating conditions. U.S. Pat. No. 3,765,492 to Irwin illustrates another earthworking implement with a tripping mechanism. Other devices have been manufactured which include an elongated pivotal guide surrounded by a compression spring to maintain the earthworking implement in proper position.

A further shortcoming in many of the prior art tripping or releasing mechanisms is due to such implements having linkages, springs, and pivot points located in the region of the earthworking implement. In this position dirt and field debris readily come in contact with the moving parts to interfere with the proper operation of the mechanism and create undue wear on parts which move relative to one another.

In other prior art devices, it has been found that the mechanical arrangement of the spring and linkages fails to properly maintain the earthworking implement in the ground under certain conditions. For example, when the implement is drawn through a region of hard soil, the backward force exerted on the implement is of sufficient magnitude to overcome the biasing force of the spring. As a result, the implement pivots backwardly out of the ground to render it virtually inoperative. Such devices also generally exhibit the inability to properly reset the earthworking implement, as discussed above.

In order to overcome many of the shortcomings previously discussed, many manufacturers have turned to hydraulic cylinders for the earthworking implement biasing means. Hydraulic cylinders have the ability to absorb large amounts of energy, are easy to adjust for various loads and can reset the earthworking implement after having passed an obstruction. However, hydraulic cylinders are expensive, require maintainance and provide a limited amount of movement of the earthworking tool. Further, hydraulic cylinders have a natural tendency to leak, thereby either losing some of their efficiency or requiring the operator to readjust or refill the cylinders. Hydraulic arrangements also have a fixed amount of reservoir fluid. In the situation where a plurality of plows or other earthworking implements are provided on a common plow beam assembly and two or more of the plows simultaneously engage an obstruction, the reset power of the system is greatly diminished because the reservoir fluid has to exert an adequate amount of force on each of the tripped implements.

A more basic shortcoming in almost all of the prior art devices is the failure to provide a reset mechanism having a simple design and a minimum number of parts. Such complex arrangements are, quite naturally, more expensive, thereby causing a corresponding consumer displeasure.

The present invention overcomes these prior art inadequacies and shortcomings, while providing numerous other advantages. For example, this invention employs a linkage arrangement situated above the plow shares so that debris does not engage the pivot points to interfere with proper operation. Further, a compression spring is strategically located at the elbow of a toggle link assembly to eliminate the necessity of a separate latch mechanism and to provide sufficient power to reset the earthworking implement after having engaged an obstruction.

SUMMARY OF THE INVENTION

The present invention involves an automatic reset mechanism for allowing a plow or other earthworking implement to be retracted from its operative position upon encountering an obstruction. To accomplish this, the plow is pivotally mounted to a frame member and is resiliently biased to its normal operating position by a toggle link reset arrangement.

The reset mechanism includes a lower toggle link pivotally mounted to the plow and an upper toggle link pivotally mounted to the plow frame. These links are pivotally connected together about a common axis on a coupling member which is slideably fitted on a pair of parallel guide rails. These guide rails are also pivotally mounted to the plow frame to allow retraction of the earthworking implement. A compression spring resiliently biases the coupling element, the toggle links and the earthworking implement in their operative positions.

In normal conditions, the earthworking implement is drawn forward by an agricultural vehicle. The forces exerted on the plow as a result of being drawn through the soil are transmitted back to the frame through the plow pivotal connection and through the upper and lower toggle links of the automatic reset assembly. Any forces transmitted along the lower toggle link to the coupling element have a directional component along the guide. These forces are effectively counterbalanced by the compression spring to maintain the plow in proper position. However, when the plow encounters an unyieldable object, such as a stump, rock, or the like, the compressive force of the spring is overcome by the force on the lower toggle link. As a result, the plow is permitted to pivot backwardly and upwardly in order to circumvent the obstruction. After the plow has passed the obstruction, the compressive force of the spring forces the coupling element to its normal operating position. In turn, the lower toggle link follows the coupling element and returns the plow to its preset, normal operative position.

In the disclosed embodiment of the plow reset, an abutment block is mounted within the guide rails to limit the downward movement of the coupling element and toggle links. When the plow encounters an obstruction, the slide element is forced backwardly against the compression force of the spring, away from this abutment block. In this position, the entire reset mechanism is, in effect "cocked". Once the obstruction has been passed, the compression spring rams the slide element and associated toggle links forward until it engages the abutment block. At this particular moment, large stresses are created in the parts of the assembly because of the instantaneous deceleration of the coupling element. To alleviate this problem, the present invention also contemplates providing an optional damper system interconnecting the upper toggle link with the frame.

In accordance with a preferred embodiment of the damper system, the upper toggle link is pivotally mounted to the frame for limited axial movement. A spring biasing means maintains the toggle link in a normal operative position, yet allows this link to move relative to the frame in response to the forces generated at the moment the plow is reset in its downward position.

DETAILED DESCRIPTION OF THE INVENTION

Figure 1:
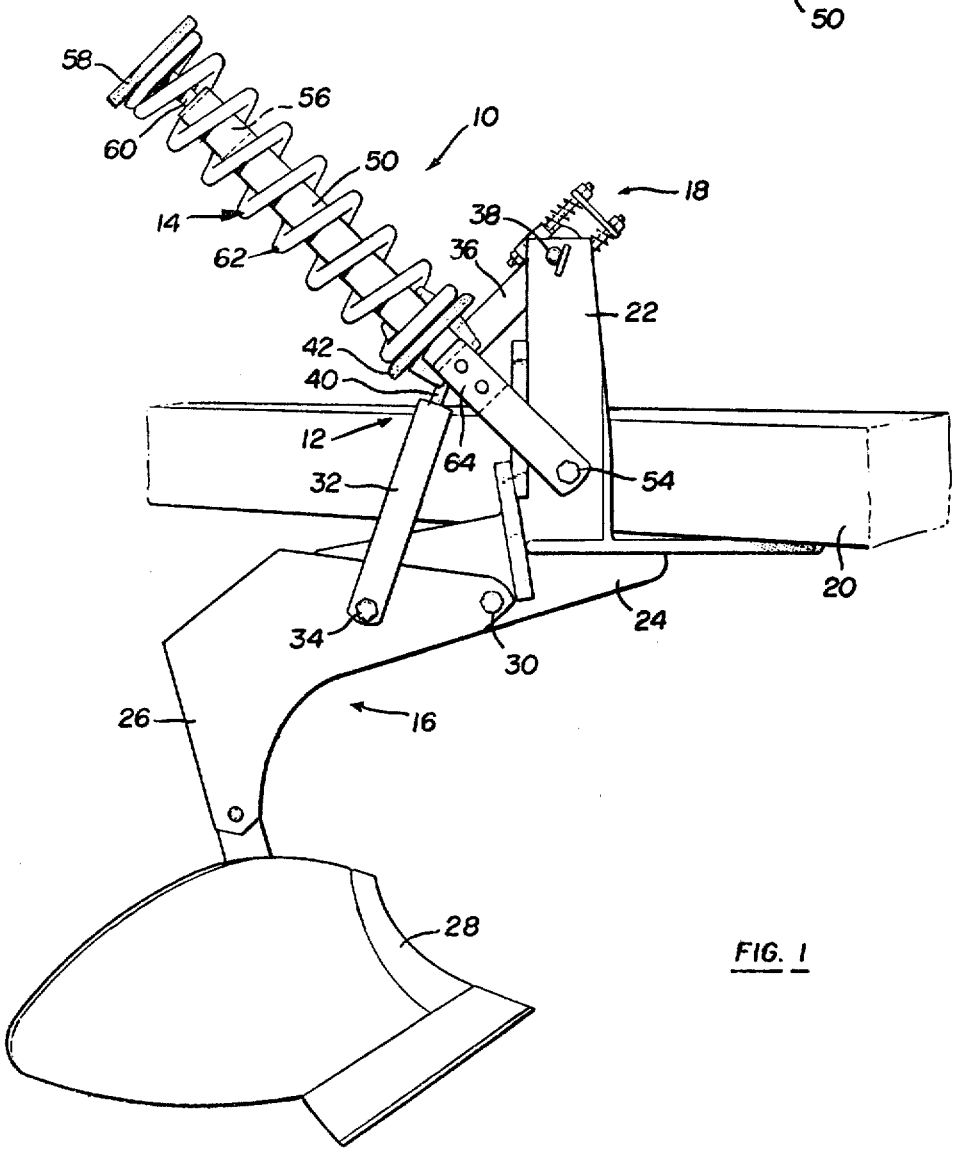
FIG. 1 is a side elevational view of the automatic reset plow assembly with the plow in the normal operative position.
Figure 2:
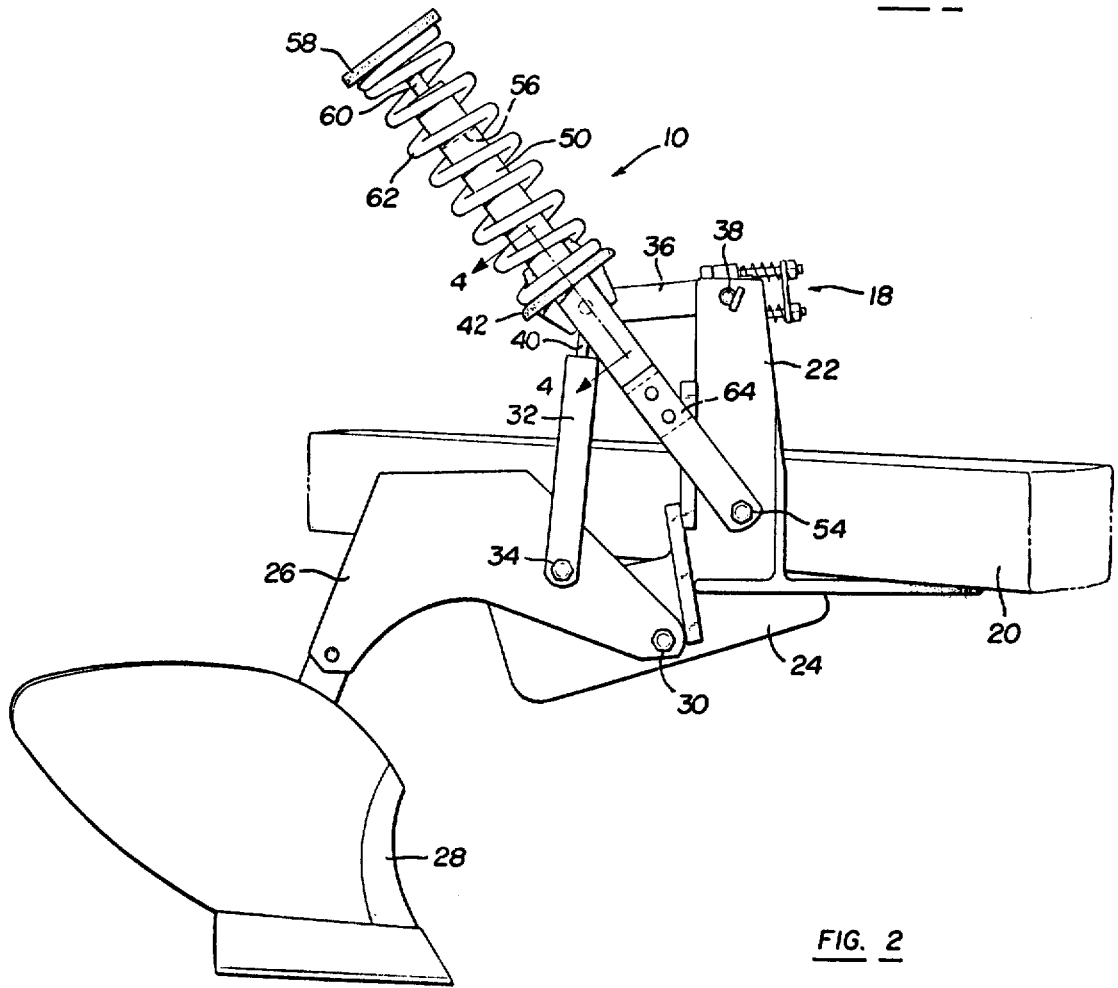
FIG. 2 is a side elevational view similar to FIG. 1, illustrating the plow in the retracted position.

The overall arrangement of the automatic reset plow assembly is illustrated in FIGS. 1 and 2 by reference numeral 10. The assembly includes a toggle link mechanism 12, a spring reset guide 14, an earthworking implement 16, and a reset damper assembly 18.

The plow and reset assembly is mounted on a main frame member 20, which includes an upstanding mast 22 and a bottom support plate 24. Frame 20 is, for example, a generally diagonally extending main frame member of a conventional semi-mounted mold board plow.

The earthworking implement 16 is illustrated as including a plow standard 26 and a plow share 28. The plow share is rigidly connected to the standard by any suitable means well known in the art, such as rivets or bolts. Plow standard 26 is pivotally mounted on bottom support plate 24 of frame 20 by any suitable means such as a pin or bolt as illustrated by reference numeral 30.

Toggle link mechanism 12 normally maintains the plow in the operative position shown in FIG. 1. This mechanism includes a lower link 32 pivotally connected to the plow standard at 34 and an upper link 36 pivotally connected to the mast 22 at 38. In the preferred embodiment, lower link 32 includes an adjustable eye bolt 40, and upper link 36 consists of two parallel metal plates, only one of which can be seen in FIGS. 1 and 2.

The upper and lower links are pivotally connected together by slide coupling member 42 of the spring reset guide to form the elbow of the toggle link.

Figure 3:
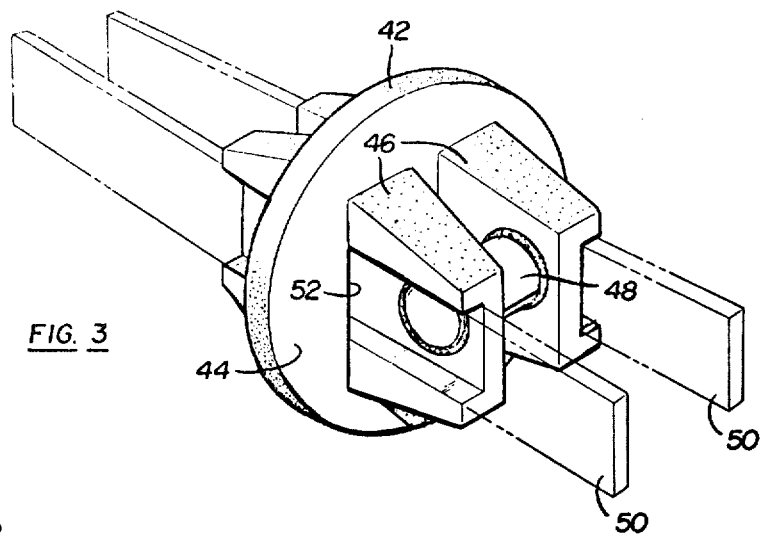
FIG. 3 is a perspective view of the slide coupling member on the automatic reset assembly.

As shown in FIG. 3, slide 42 includes a generally cylindrical base 44 and two projecting C-shape supports 46. Pin 48 extends between supports 46 and pivotally receives the upper end of link 32 and the lower end of link plates 36. This arrangement is best illustrated by FIG. 4.

As discussed previously, the upper end of link 32 optionally includes an eye bolt 40. FIG. 4 illustrates that the eye of bolt 40 is pivotally received around pin 48. The lower end of the eye bolt is threadably received in a threaded bore in the upper end of link 32. The threaded bore in link 32 is of a sufficient length to enable the eye bolt to be threaded into the link to varying extents. By this arrangement, the total effective length of the lower toggle link may be varied to adjust the operating position and inclination of plow share 28.

Figure 4:
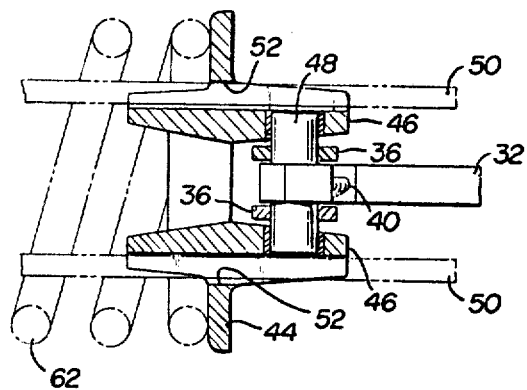
FIG. 4 is a sectional view taken along lines 4—4 of FIG. 2, illustrating the connection of the toggle links with the slide member.

FIG. 4 further illustrates the preferred embodiment of upper link 36 as including two parallel metal plates. The ends of these plates include circular holes through which pin 48 is pivotally received.

Member 42 is slideably mounted on parallel guide rails 50 of the spring reset guide 14. As illustrated in FIGS. 3 and 4, slide 42 includes two rectangular slots 52 having a shape and configuration approximately that of the guide rails. These slots are aligned with the C-shape projection 46 to assure that the slide member is properly supported and positioned on the guide.

Guide rails 50 are pivotally mounted on the frame mast at 54 about a common axis. Although only one such guide rail can be seen in FIGS. 1 and 2, it is to be understood that in the preferred embodiment, one guide rail will be pivotally mounted on each side of the mast at 54 to maintain the rails in parallel, spaced relationship. The upper end of the guide rails are connected together by an end block, shown in phantom in FIGS. 1 and 2 by reference numeral 56. A spring retainer 58 includes a threaded rod 60 which is threadably mounted in a complementary threaded bore in end block 60. Compression spring 62 surrounds the guide rails and is interposed between the spring retainer 58 and slide member 42 to resiliently bias the toggle links and earthworking implement in their normal operative position shown in FIG. 1. As best shown in FIG. 4, the diameter of spring 62 is chosen so that it will abut against the cylindrical base 44 of the slide member 42 to very effectively distribute the compressive retention forces.

Spring 62 maintains a constant pressure on the common pivotal connection between the toggle links to resist forces transmitted to the lower toggle link from the plow. When the plow encounters an immovable obstruction, it can pivot backwardly and upwardly to ride over the obstruction. As the plow passes the obstruction, it is forced back into the ground by the spring compressive force acting on the elbow of the toggle link connection.

Spring retainer 58 may be adjusted, relative to guide rails 50, by threading rod 62 into end block 56. Such an adjustment will vary the compressive factor of compression coil spring 62 to alter the magnitude of the force required to retract coupling element 42, lower toggle link 32, and plow share 28. For example, the force exerted on plow share 28 will vary according to soil conditions; a greater force will be exerted on plow share 28 when plowing in relatively hard soil as opposed to relatively soft or sandy soil. To assure that the plow does not inadvertently retract merely in response to this soil condition, the spring retainer element 58 can be advanced to increase the force of the spring 62 on coupling element 42 by threadedly advancing rod 60 into end block 56.

A lower abutment block 64 (shown in phantom in FIGS. 1 and 2) is mounted between the guide rails to limit the downward movement of slide 42 and to thereby limit the forward pivotal movement of plow 28. The position of lower block 64 is chosen so that the upper and lower toggle links are prevented from linearly aligned. Interchangeable blocks having different sizes may be employed for this purpose in order to vary the preset operative position of the earthworking implement.

The primary advantage afforded by the automatic reset plow assembly of the present invention is the reduction of damage to the plow or other earthworking implement caused by immovable obstructions. This is accomplished by pivotally mounting the plow to the plow frame so that when an immovable obstruction is engaged, the plow may pivot out of the way of the obstruction. It is equally important that the plow be reset properly back into the soil after the obstruction has been passed. This is accomplished in the present invention by strategically locating the return compression spring at the elbow of a toggle link mechanism. It can be seen from FIGS. 1 and 2 that as the plow is pivotally retracted, the angle between the lower toggle link and guide rails is increased. As a result, in the retracted position, a greater proportion of the spring compressive force is directed to the lower toggle link 32. Therefore, when the force from the obstruction is relieved from plow 28, the compression spring 62 rams the slide coupling element 42 and lower link 32 downwardly to assure that plow 28 regains its proper plowing position. The precise angular relationship between guide 64, lower link 32, and upper link 36 is critical only to the extent of transmitting sufficient forces from the compression spring to the lower toggle link in order to properly reset the plow in its proper operative position. This relationship can be determined from a simple force diagram taking into account the compressive force of the spring.

The automatic reset mechanism of the present invention therefore surpasses other prior art toggle link assemblies by preventing inadvertent tripping and assuring that the plow properly resets in the soil after encountering an obstruction. Further, it can be seen from FIGS. 1 and 2 that the reset mechanism is situated well above the earthworking implement. This diminishes the possibility of dirt and field debris collecting within the components of the reset mechanism and causing undue wear.

Another highly desireable feature of the present invention is the placement of the plow share relative to the pivot point of the plow standard. It can be seen from FIG. 1 that the point of the plow share 28 is generally vertically beneath pivot point 30. This assures that the plow will pivot upwardly and backwardly upon encountering an obstruction rather than pivoting downwardly into the soil.

Figure 6:
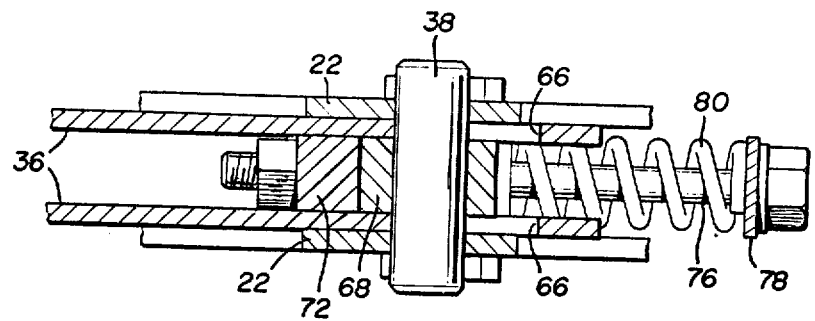
FIG. 6 is a sectional view taken along lines 6—6 of FIG. 5, illustrating the connection of the upper link with the damper assembly.
Figure 5:
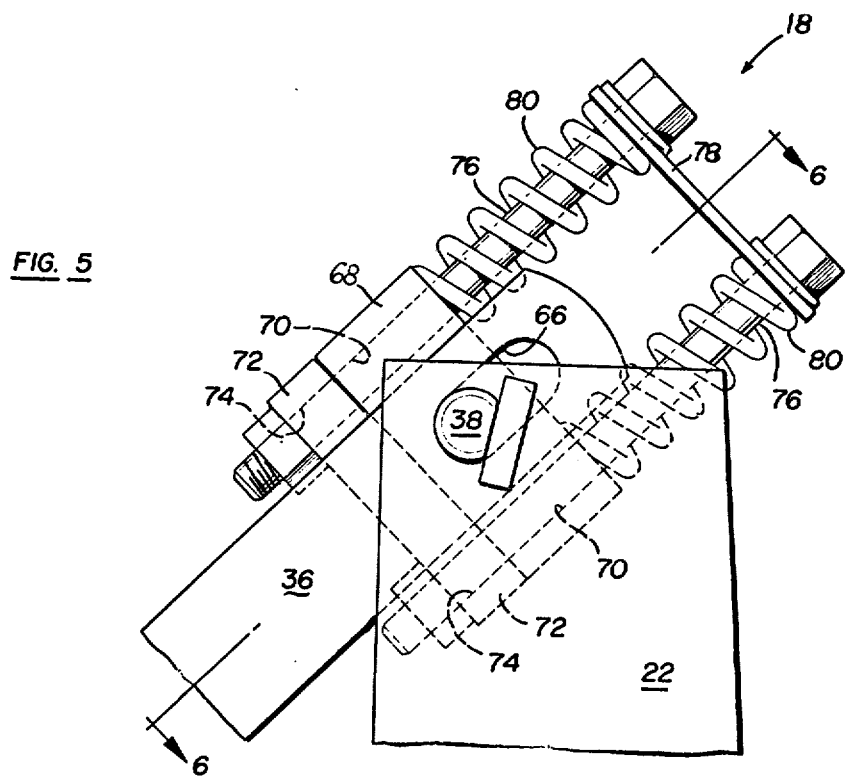
FIG. 5 is a detailed view of the damper reset assembly interconnecting the upper toggle link with the frame mast.

The automatic reset mechanism may further optionally include a damper system 18 (shown in detail in FIGS. 5 and 6). In this embodiment, upper links 36 have a slot 66 through which pivot support pin 38 is received. As illustrated in FIG. 6, mast 22 is bifurcated in the region of the pivotal connection with the upper toggle link to afford greater stability to the reset mechanism.

A pivotal abutment plate 68 is pivotally mounted on pin 38 between links 36, and includes two bores 70 for a purpose described below. Slideable support plate 72 is rigidly attached to links 36, for example by welding, and includes two bores 74 mating with bores 70 of pivotal plate 68. Two bolts 76 fit through the mating bores 70 and 74, and extend outwardly therefrom to connect to a back plate 78. Compression springs 80 are interposed between the plates 68 and 78 and surround each bolt to resiliently bias plate 78 to its normal operative position shown in FIG. 5. Plate 72 is in turn biased by bolts 76 to abut against pivotal plate 68. As a result, links 36 are normally maintained in the position shown in FIGS. 5 and 6.

During normal plowing operation, the forces which are transmitted from plow 28 to upper link 36 are further transmitted to mast 22 through plate 72, plate 68, and pivotal pin 38. When the plow has encountered an obstruction and has been reset by spring reset guide 14 and toggle link assembly 12, slide member 42 is rammed against abutment block 64. At the precise moment that this resetting operation is completed, the entire system is subjected to a "shock" because the pivoting elements are instantaneously stopped. As a result, these parts are subjected to large stress loads.

Damper system 18 alleviates these peak stress loads by permitting upper toggle links 36 to move relative to mast 22. As a result, guide rails 50 and lower toggle link 32 are permitted to move downwardly under the influence of compression springs 80, to thereby damper the high stress loads experienced during resetting. Thereafter, upper toggle links 36 are returned to their normal operating position, as shown in FIG. 5, by the compression springs of the damper assembly.

OPERATION

During normal plowing operation, the components of the present invention will be situated as illustrated in FIG. 1. In this position, forces experienced by the plow as a result of being drawn through the soil are transmitted to frame member 20 through the pivotal connection with lower support plate 24 and through lower toggle link 32 to the automatic reset mechanism. The force transmitted through link 32 can be broken into components parallel to and perpendicular to guide rails 50. The force components perpendicular to guide rails 50 are transmitted through upper link 36 to mast 22. Components of the force parallel to guide rails 50 are effectively counteredbalanced by compressive spring 62 to maintain the components in a static, normal operating position.

When the plow 28 encounters an immovable obstruction, the forces transmitted through toggle link 32 are sufficient to retract slide coupling element 42 against the compressive forces of spring 62. As can be seen in FIG. 2, plow share 28 pivots upwardly and backwardly, thereby causing guide rails 50 to pivot slightly in a clockwise direction in response to the movement of slide coupling element 42 and upper and lower toggle links. Once the immovable obstruction has been passed, compression spring 62 forces the slide element back to its normal seating position against block 64. This forces lower toggle link 32 to pivot the plow standard and plow share downwardly to regain its normal operating position. Damper assembly 18 permits upper toggle link 36 to move slightly relative to mast 22 at the moment slide element 42 engages block 64 in order to reduce "shock" stress forces in the component parts.

It is to be understood that the previously described embodiments have been merely illustrative of the present invention and not limiting. The present invention is intended to cover any variations and innovations which would be obvious to one skilled in the art from this disclosure. For example, although only one plow and reset mechanism have been illustrated, a plurality of such assemblies would preferably be positioned along the length of frame 20.

Having fully and completely described our invention, we claim:

1. In an automatic reset assembly for an earth working implement, comprising:

an elongated, generally horizontal frame for an earth working implement, and including a member which is stationary relative to the frame;

an earth working implement pivotally connected to said frame;

an elongated guide member pivotally connected directly to the stationary member above said implement at a pivot point which is stationary relative to the frame;

a first toggle link pivotally connected to the stationary member at a point above and spaced from said guide pivotal connection;

a second toggle link pivotally connected to the earth working implement;

a slide member slideably mounted on said guide, said first and second toggle links pivotally connected to said slide;

means resiliently biasing said slide and toggle links toward the stationary pivotal connection between the guide and stationary member;

an abutment between the slide member and the stationary pivotal connection, said abutment limiting the movement of said slide and links toward said stationary pivotal connection and preventing the toggle links from reaching a dead center position;

the earth working implement being resiliently biased downwardly through the force exerted on said second toggle link by said biasing means, said biasing means (1) allowing the implement to pivot upwardly when it strikes an immovable object and (2) automaticaally downwardly pivoting said implement once the object has been passed to properly reset the implement for further operation; and a reset damper system characterized by said first link being pivotally connected to said stationary member about a pivot pin which is stationary relative to the frame, said first link including a slot through which said pin extends, and said slot having a major dimension along the axis of the first link greater than the diameter of the pin to allow limited movement of the first link along its axis, and means (1) resiliently biasing the first link axially away from its connection with the slide member, (2) permitting the first link to move along its axis relative to the stationary pivot pin when the earth working implement is reset and (3) returning the first link to its normal operative position after the resetting operation.

* * * * *